US010612982B2

(12) United States Patent
Coreth et al.

(10) Patent No.: US 10,612,982 B2
(45) Date of Patent: Apr. 7, 2020

(54) MODULAR SENSING FIBER OPTIC CABLES (71) Applicant: Simmonds Precision Products, Inc., Vergennes, VT (US)

(72) Inventors: Stefan Coreth, Roanoke Rapids, NC (US); Lei Liu, Wake Forest, NC (US); Kenneth Bell, Epsom (GB)

(73) Assignee: Kidde Technologies, Inc., Wilson, NC (US)

( * ) Notice: Subject to any disclaimer, the term of this patent is extended or adjusted under 35 U.S.C. 154(b) by 172 days.

(21) Appl. No.: 15/603,170

(22) Filed: May 23, 2017

(65) Prior Publication Data

US 2018/0340841 A1 Nov. 29, 2018

(51) Int. Cl.
*G01K 11/32* (2006.01)
*G02B 6/44* (2006.01)

(52) U.S. Cl.
CPC ........ *G01K 11/3206* (2013.01); *G02B 6/4482* (2013.01)

(58) Field of Classification Search
CPC .................................................... G01K 1/026
See application file for complete search history.

(56) References Cited

U.S. PATENT DOCUMENTS

| | | | | |
|---|---|---|---|---|
| 5,987,204 A * | 11/1999 | Lee | ...................... | G02B 6/4403 174/117 F |
| 6,272,886 B1 | 8/2001 | Novack et al. | | |
| 6,293,081 B1 * | 9/2001 | Grulick | ................ | G02B 6/4482 174/112 |
| 6,702,897 B2 | 3/2004 | Cullen et al. | | |
| 6,850,461 B2 * | 2/2005 | Maas | ........................ | G01V 1/22 367/149 |
| 7,282,698 B2 * | 10/2007 | Childers | ............... | E21B 47/065 250/227.14 |
| 7,315,664 B2 | 1/2008 | Weaver | | |
| 7,418,171 B2 * | 8/2008 | Grattan | ................... | G01L 1/242 374/E11.016 |
| 7,575,465 B2 * | 8/2009 | Hanks | .................. | H01R 4/5033 174/112 |
| 8,208,767 B2 * | 6/2012 | Duncan | ................... | E21B 47/06 250/227.18 |

(Continued)

FOREIGN PATENT DOCUMENTS

WO 2015142343 A1 9/2015

OTHER PUBLICATIONS

Minakuchi et al, "Hierarchical Fiber-optic-based Sensing System: Impact Damage Monitoring of Large-scale CFRP Structures." Smart Materials and Structures 20, No. 8 (Jul. 29, 2011). doi:10.1088/0964-1726/20/8/085029 (Year: 2011).*

(Continued)

*Primary Examiner* — Clayton E. LaBalle
*Assistant Examiner* — Leon W Rhodes, Jr.
(74) *Attorney, Agent, or Firm* — Kinney & Lange, P.A.

(57) ABSTRACT

Overheat and fire detection for aircraft systems includes at least one temperature sensing fiber optic cable. The at least one fiber optic cable is comprised of a plurality of modular fiber optic cables. The plurality of modular fiber optic cables includes at least one sensing and one non-sensing section. Portions of the at least one temperature sensing fiber optic cable can be removed and replace with separate modular fiber optic cables.

18 Claims, 5 Drawing Sheets

(56) References Cited

U.S. PATENT DOCUMENTS

| | | | |
|---|---|---|---|
| 8,909,040 B1* | 12/2014 | Parker, Jr. | G02B 6/35 |
| | | | 398/25 |
| 9,335,482 B2 | 5/2016 | Hao et al. | |
| 2012/0148204 A1 | 6/2012 | Ringgenberg et al. | |
| 2013/0322490 A1* | 12/2013 | Bell | G01K 11/3206 |
| | | | 374/161 |
| 2014/0029889 A1 | 1/2014 | Brehm et al. | |
| 2017/0021914 A1 | 1/2017 | Small et al. | |

OTHER PUBLICATIONS

"Fiber Bragg Grating (FBG) Writing with Excimer Lasers. Fiber Optic Smart Structures on the Rise," Coherent, Dec. 25, 2016. http://www.coherent.co.jp/document/whitepaper/pld/excimer_for_FBGs.pdf.

"Minimized FBG Strain Sensor," Fiberpro, May 24, 2011. https://web.archive.org/web/20110524200114if_http://www.sun-ins.com/old/fiberpro/FBG/MinimizedFBG%20Strain%20sensor%20mss1700.pdf.

Extended European Search Report for EP Application No. 18172825.4, dated Sep. 26, 2018, 9 pages.

* cited by examiner

MODULAR SENSING FIBER OPTIC CABLES

BACKGROUND

This disclosure relates generally to aircraft system health monitoring for overheat and fire detection systems. More particularly, this disclosure relates to maintenance and repair of aircraft system health monitoring using optical signals.

Overheat detection systems monitor various zones within an aircraft, such as bleed air ducts where high temperature, high pressure air is bled from the compressor stage of an engine, or in the wheel well of an aircraft to sense overheated brakes and/or "hot" tires which indicate that the tire has a low air pressure or that the brakes are hot. Overheat detection can be used for any equipment on the aircraft that requires monitoring for overheat conditions, such as electric motors, compressors, etc. Bleed air is utilized for a variety of functions on the aircraft, such as engine and airframe anti-icing, internal cooling of the engine, cabin pressurization and environmental controls, pressurization of hydraulic reservoirs and seals, and others. The bleed air typically has a temperature between 100° F. and 1,100° F. depending on the distance that the bleed air has traveled from the engine. The high temperature and pressure of the bleed air means that the bleed air may damage the aircraft if a leak or rupture occurs in the bleed duct. As such, overheat detection systems have sensors that run the length of the bleed ducts, or along structures in the vicinity of the bleed ducts, to monitor for temperature changes that would indicate leaks or ruptures in the duct.

Prior art overheat detection systems typically utilize eutectic salt technology to sense an overheat event. The eutectic salt surrounds a central conductor and the eutectic salt is surrounded by an outer sheath. A monitoring signal is sent down the central conductor, and under normal operating conditions the eutectic salt operates as an insulator such that no conduction occurs between the central conductor and the outer sheath. When an overheat event occurs, however, a portion of the eutectic salt melts and a low-impedance path is formed between the central conductor and the outer sheath. The low-impedance path is sensed by an electronic controller, which generates an overheat alarm signal. When the overheat event has subsided, the eutectic salt re-solidifies and once again insulates the central conductor. Through the use of various salts to create a eutectic mixture, a specific melting point for the salt can be achieved; thereby allowing different eutectic salts to be used in different areas of the aircraft to provide overheat monitoring across a variety of temperatures. While the eutectic salt technology allows for overheat events to be detected, the eutectic salt technology merely provides a binary indication of whether an overheat event has or has not occurred.

SUMMARY

In one example, a temperature sensing fiber optic cable is configured to monitor temperature in an aircraft. The temperature sensing fiber optic cable is comprised of a plurality of modular fiber optic cables. Each of these modular fiber optic cables includes sensing and non-sensing sections. Modular fiber optic cables have an outer jacket that can include indicia to indicate its sensing and non-sensing sections and/or the center frequency of the sensing sections. Portions of the temperature sensing fiber optic cable can be removed and replaced with modular fiber optic cables. Removing portions of the temperature sensing fiber optic cable can be done by cutting the temperature sensing fiber optic cable at non-sensing sections. Replacing the removed portions of the temperature sensing cable with modular fiber optic cables can be done using fusion splicing. The modular fiber optic cable replacing the removed portion(s) can be selected based upon length, number of sensing sections, and/or the center frequency of the sensing sections.

In one example, a system configured to monitor the temperature of an aircraft includes a plurality of temperature sensing fiber optic cables. The plurality of temperature sensing fiber optic cables is comprised of a plurality of modular fiber optic cables. Each of these modular fiber optic cables includes sensing and non-sensing sections. Modular fiber optic cables have an outer jacket that can include indicia to indicate its sensing and non-sensing sections and/or the center frequency of the sensing sections. Portions of the temperature sensing fiber optic cable can be removed and replaced with modular fiber optic cables. Removing portions of the temperature sensing fiber optic cable can be done by cutting the temperature sensing fiber optic cable at non-sensing sections. Replacing the removed portion(s) of the temperature sensing cable with modular fiber optic cables can be done using fusion splicing. The modular fiber optic cable replacing the removed portions can be selected based upon length, number of sensing sections, and/or the center frequency of the sensing sections. The plurality of temperature sensing fiber optic cables can span multiple zones of the aircraft. The plurality of temperature sensing fiber optic cables can have a different center frequency for each zone of the aircraft. Each of the plurality of temperature sensing fiber optic cables can have a same center frequency. Each of the plurality of temperature sensing fiber optic cables can have a different center frequency.

DETAILED DESCRIPTION

Apparatus, systems, and associated methods relate to overheat detection using fiber optic cables, and repairing and/or replacing portions of such cables. In some applications, such as overheat detection in an airplane, replacing an entire fiber optic cable can be burdensome. In some cases, it may require dismantling large sections of the airplane if not the entire airplane. Using the apparatus, systems, and associated methods herein, allows for replacement of portions of a fiber optic cable with modular fiber optic cable sections without significantly affecting the performance of the entire fiber optic cable. A portion of the fiber optic cable can be cut, or otherwise disconnected, from the fiber optic cable at non-sensing sections. A modular fiber optic cable with significantly similar characteristics can then be connected to the fiber optic cable at the same non-sensing sections. In this way, only the portion(s) of the fiber optic cable that needs to be replaced is removed and replaced; and only the area(s) of the airplane containing the portion of the fiber optic cable that is replaced need to be dismantled.

Figure 1:
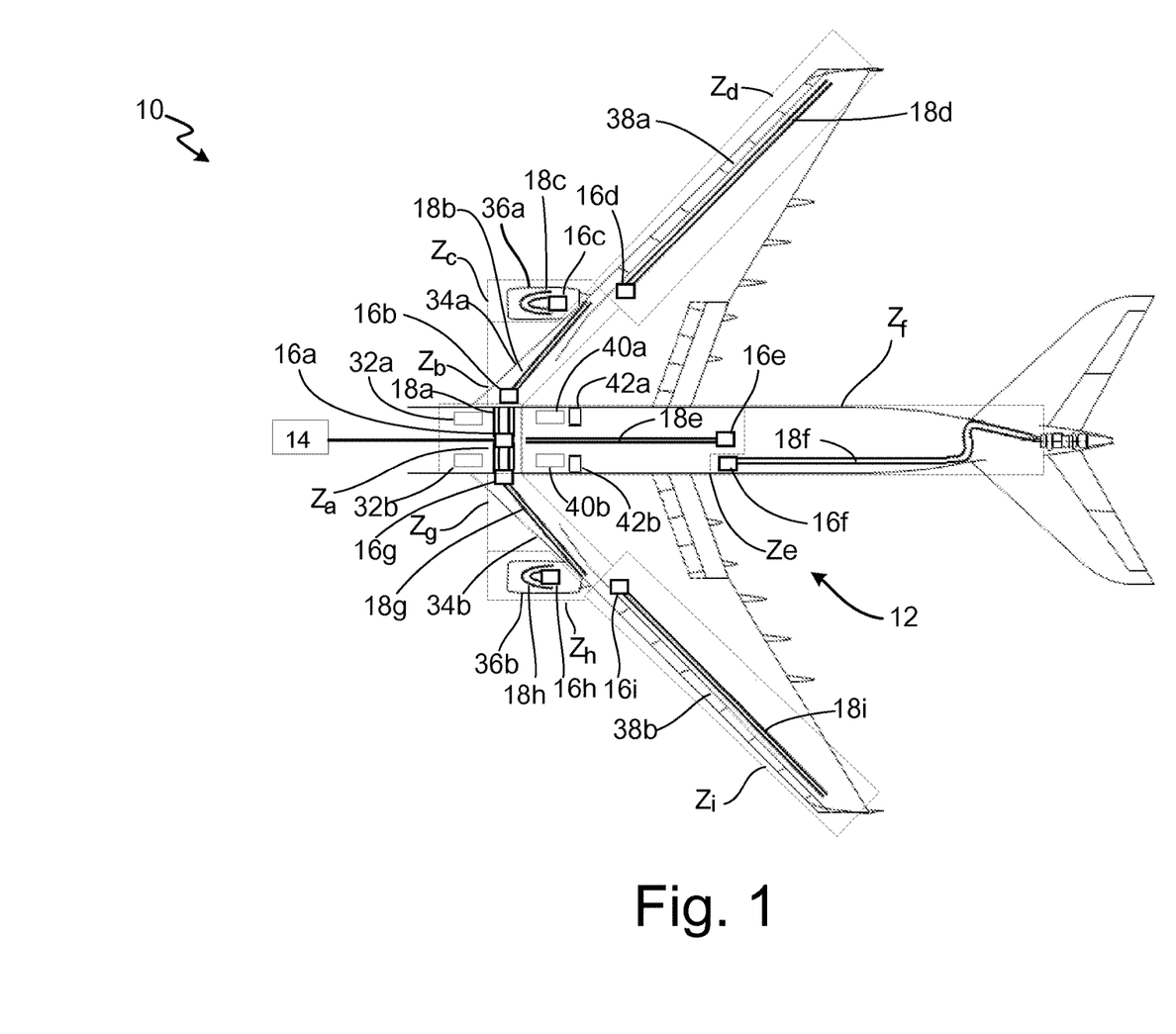
FIG. 1 is a schematic view of an overheat detection system architecture for monitoring different zones of an aircraft.

FIG. 1 is a schematic view of overheat detection system 10 for aircraft 12. Aircraft 12 includes zones Za-Zi and avionics controller 14. Overheat detection system 10 includes interrogators 16a-16i and fiber optic cable bundles 18a-18i. Fiber optic cable bundles 18a-18i are connected to interrogators 16a-16i. Fiber optic cable bundles 18a-18i provide at least one fiber optic cable to each of zones Za-Zi of aircraft 12. Interrogators 16a-16i are connected to avionics controller 14 to communicate with other systems within aircraft 12.

Interrogators 16a-16i may include optical transmitters configured to control the transmission of an optical signal through connected fiber optic cable bundles 18a-18i. Interrogators 16a-16i may also include optical receivers configured to receive an optical signal and to analyze the optical signal received. Interrogators 16a-16i may include a microprocessor, microcontroller, application-specific integrated circuit (ASIC), digital signal processor (DSP), field programmable gate-array (FPGA) or any other circuit capable of controlling and receiving signals. Interrogators 16a-16i may include one or more computer-readable memory encoded with instructions that, when executed by the controller 16, cause interrogators 16a-16i and/or other elements of overheat detection system 10 to operate in accordance with techniques described herein. Interrogators 16a-16i may further communicate with avionics controller 14 to communicate temperature data to avionics controller 14 using a wired or wireless connection. It is understood that all communications for overheat detection system 10 can be made using wired, wireless, or optical communications or some combination of these methods.

Computer-readable memory of interrogators 16a-16i can be configured to store information within interrogators 16a-16i during and after operation. Computer-readable memory, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory can include temporary memory, meaning that a primary purpose of the computer-readable memory is not long-term storage. Computer-readable memory, in some examples, can be described as a volatile memory, meaning that the computer-readable memory does not maintain stored contents when electrical power to interrogators 16a-16i is removed. Examples of volatile memories can include random access memories (RAM), dynamic random access memories (DRAM), static random access memories (SRAM), and other forms of volatile memories. In some examples, computer-readable memory can be used to store program instructions for execution by one or more processors of interrogators 16a-16i. For instance, computer-readable memory can be used by software or applications executed by interrogators 16a-16i to temporarily store information during program execution.

Interrogators 16a-16i control the transmission of optical signals to all fiber optic cables of fiber optic cable bundles 18a-18i. Interrogators 16a-16i receive and analyze signals from the fiber optic cables of fiber optic cable bundles 18a-18i. Interrogators 16a-16i analyze the received optical signals. Variations in the optical signals analyzed by interrogators 16a-16i allow interrogators 16a-16i to determine the temperature within zones Za-Zi and to determine the location that a temperature variation occurs in within zones Za-Zi. The variations in the optical signals also allow interrogators 16a-16i to determine the strain experienced at various locations along any fiber optic cable of fiber optic cable bundle 18.

Interrogators 16a-16i can be connected to an end of each cable from respective fiber optic cable bundles 18a-18i. Interrogators 16a-16i are configured to provide an optical signal to the connected end of each cable. Each interrogator of interrogators 16a-16i may include any suitable optical source for providing an optical signal to each fiber optic cable. For example, optical interrogator 16a may include a light-emitting diode or a laser. It is further understood that interrogator 16a may be configured to provide the optical signal in any suitable manner, such as through a single pulse at a fixed wavelength; a tunable swept-wavelength; a broad-band signal; or a tunable pulse.

Interrogators 16a-16i are configured to receive an optical signal from each fiber optic cable from respective fiber optic cable bundles 18a-18i. For example, interrogator 16a provides an optical signal through a first end of a first fiber optic cable. A first portion of the optical signal travels through first fiber optic cable to a second end of first fiber optic cable. A second portion of the optical signal can be reflected back to the first end of fiber optic cable and received by interrogator 16a. Interrogator 16a may communicate information regarding the second portion of the optical signal to avionics controller 14. Interrogator 16a may include any suitable receiver for receiving an optical signal. For example, interrogator 16a may include a photodiode, a photodiode array, a phototransistor, or any other suitable optical receiving device. Furthermore, while interrogators 16a-16i are described as including an optical transmitter and an optical receiver, it is understood that interrogators 16a-16i may include any number of optical transmitters and receivers for providing and receiving optical signals to any number of fiber optic cables needed to monitor airplane 12.

Fiber optic cable bundles 18a-18i may include enough fiber optic cables to extend at least one fiber optic cable through all zones Za-Zi in aircraft 12. Zones Za-Zi may include any location on aircraft 12 where overheat detection is desired. For example, zones Za-Zi may include bleed air ducts, cross-over bleed air ducts, wheel wells, wing boxes, Air Conditioning (A/C) packs, anti-icing systems, nitrogen generation systems, or any other area where temperature sensing is desirable. Zones Za-Zi may be divided and assigned in any desired manner. In the illustrated example, zone Za includes right side cross-over bleed air duct 32a, left side cross-over bleed air duct 32b, interrogator 16a, and fiber optic cable bundle 18a; zone Zb includes right wing box 34a, interrogator 16b, and fiber optic cable bundle 18b; zone Zc includes right pylon 36a, interrogator 16c, and fiber optic cable bundle 18c; zone Zd includes right wing ice protection system 38a, interrogator 16d, and fiber optic cable bundle 18d; zone Ze includes rights A/C pack 40a, left A/C pack 40b, right wheel well 42a, left wheel well 42b, interrogator 16e, and fiber optic cable bundle 18e; zone Zf includes interrogator 16f and fiber optic cable bundle 18f; zone Zg includes left wing box 34b, interrogator 16g, and fiber optic cable bundle 18g; zone Zh includes left pylon 36b, interrogator 16h, and fiber optic cable bundle 18h; and zone Zi includes left wing ice protection system 38b, interrogator 16i, and fiber optic cable 18i. While aircraft 12 is described as including nine zones, it is understood that aircraft 12 may be divided into as many or as few zones as desired.

Aircraft 12 may be divided into zones in any desired manner; for example, aircraft 12 may be divided into zones based on the overheat temperature for the components located in that zone or based on system type. Each zone Za-Zi of aircraft may have a different alarm set point, such that where the temperature in zone Za is the same as the temperature in zone Zb an overheat alarm may be triggered for zone Zb but not for zone Za.

Fiber optic cable bundles 18a-18i provide at least one fiber optic cable to all zones Za-Zi of aircraft 12 to provide temperature and/or strain sensing across all zones Za-Zi. Fiber optic cable bundles 18a-18i are connected to interrogators 16a-16i, and interrogators 16a-16i are configured to determine the occurrence of an overheat event, the zone in which the overheat event has occurred, and whether the overheat event is at or above the alarm set point for that zone. Interrogators 16a-16i thus knows the length and alarm set point of each fiber optic cable in each zone Za-Zi which fiber optic cable is in each zone Za-Zi.

Interrogators 16a-16i analyze the information provided by the optical signal using the techniques discussed herein to determine the temperature in each zone Za-Zi, the strain in each zone Za-Zi, or both. Where interrogators 16a-16i determine that the temperature in a zone is above the alarm set point for that zone, interrogators 16a-16i generate an alarm signal that an overheat event has occurred. In addition to sensing the existence of an overheat event, monitoring the temperature in each zone Za-Zi allows overheat detection system 10 to provide fire detection for zones Za-Zi. For example, a dramatic, sudden increase in temperature can indicate the existence of a fire or overheat event, and because interrogators 16a-16i monitor the actual temperature instead of merely whether or not an overheat event has occurred, interrogators 16a-16i can sense the dramatic, sudden increase in temperature and provide a fire or overheat detection warning to the cockpit, to a fire suppression system, or to any other location.

Overheat detection system 10 can sense a temperature or strain at any location or at multiple locations along any fiber optic cable of fiber optic cable bundles 18a-18i. Because the temperature can be sensed at any location or multiple locations along any fiber optic cable of fiber optic cable bundled 18a-18i, a temperature profile may be developed for the entire length of each fiber optic cable of fiber optic cable bundles 18a-18i, and as such, a temperature profile may be developed for each zone Za-Zi. Overheat detection system 10 can further provide locational information regarding the exact location within each zone Za-Zi where an event occurs. The temperature profile for each zone Za-Zi can then be compared to a maximum allowable temperature profile, which can include a single temperature for an entire zone Za-Zi or multiple temperatures at varying locations in each zone Za-Zi. As such, it is understood that interrogators 16a-16i can determine any desired temperature data for any zone Za-Zi, and the temperature data can include a single temperature at a single location within a zone, temperatures at multiple locations throughout a zone, a temperature profile for a zone, or any other desired temperature data for the zone.

Interrogators 16a-16i can also generate trend data to allow for health monitoring of aircraft 12. The trend data may include data regarding temperature trends, strain trends, or both. The trend data can be stored in the memory of interrogators 16a-16i or in any other suitable storage medium at any other suitable location, such as the memory of avionics controller 14. It is understood that the data can be monitored in real time. For example, interrogators 16a-16i may communicate with a dedicated health monitoring system to monitor the temperature data in real time. The stored trend data provides statistical and historical data for the temperature, strain, or both experienced in all zones Za-Zi. The temperature trend data may be stored and monitored by maintenance personnel. As such, the temperature trend data allows maintenance personnel to determine the exact location of progressive temperature increases over time. It is further understood that interrogators 16a-16i can generate the exact location of a one-time temperature variation, strain variation, or both. Generating the locations of progressive temperature increases allows for preventative, targeted maintenance before a failure occurs. For example, the temperature trend in right wheel well 42a may be monitored to generate trend data. The trend data may show that a tire within right wheel well 42a exceeds the normal operating temperatures without reaching the alarm set point. In such a case an overheat event does not occur; however, the temperature trend data informs maintenance personnel that the tire may be close to failing or that the tire may be low on air pressure and that a maintenance action is required. Similar to temperature monitoring, the strain trend data may be stored and areas of increased strain may be located. For example, the pressure of the bleed air passing through right side cross-over bleed duct 32a may impart a strain on the wall of right side cross-over bleed duct 32a. The level of the strain and the location of the strain may be detected by interrogators 16a-16i analyzing the information received from the optical signals. The strain information may then be communicated to ground personnel and used to investigate the location of the increased strain to determine any maintenance action that should be taken.

Interrogators 16a-16i are connected to avionics controller 14 to communicate information to avionics controller 14. While interrogators 16a-16i are described as communicating with avionics controller 14, interrogators 16a-16i may communicate with aircraft 12 and with maintenance personnel in any suitable manner. Interrogators 16a-16i may also communicate directly with a cockpit of aircraft 12 to provide overheat or fire detection warnings, or to indicate that maintenance is necessary. Interrogators 16a-16i may further communicate temperature data to other non-overheat detection system computers, which may communicate an overheat status to the cockpit. Aircraft 12 may also include a central overheat detection system computer that communicates with various overheat detection systems on aircraft, and the central overheat detection system computer may communicate any overheat status from any overheat detection system to the cockpit. It is understood that all communications for overheat detection system 10 can be made using wired, wireless, or optical communications or some combination of these methods.

Figure 2:
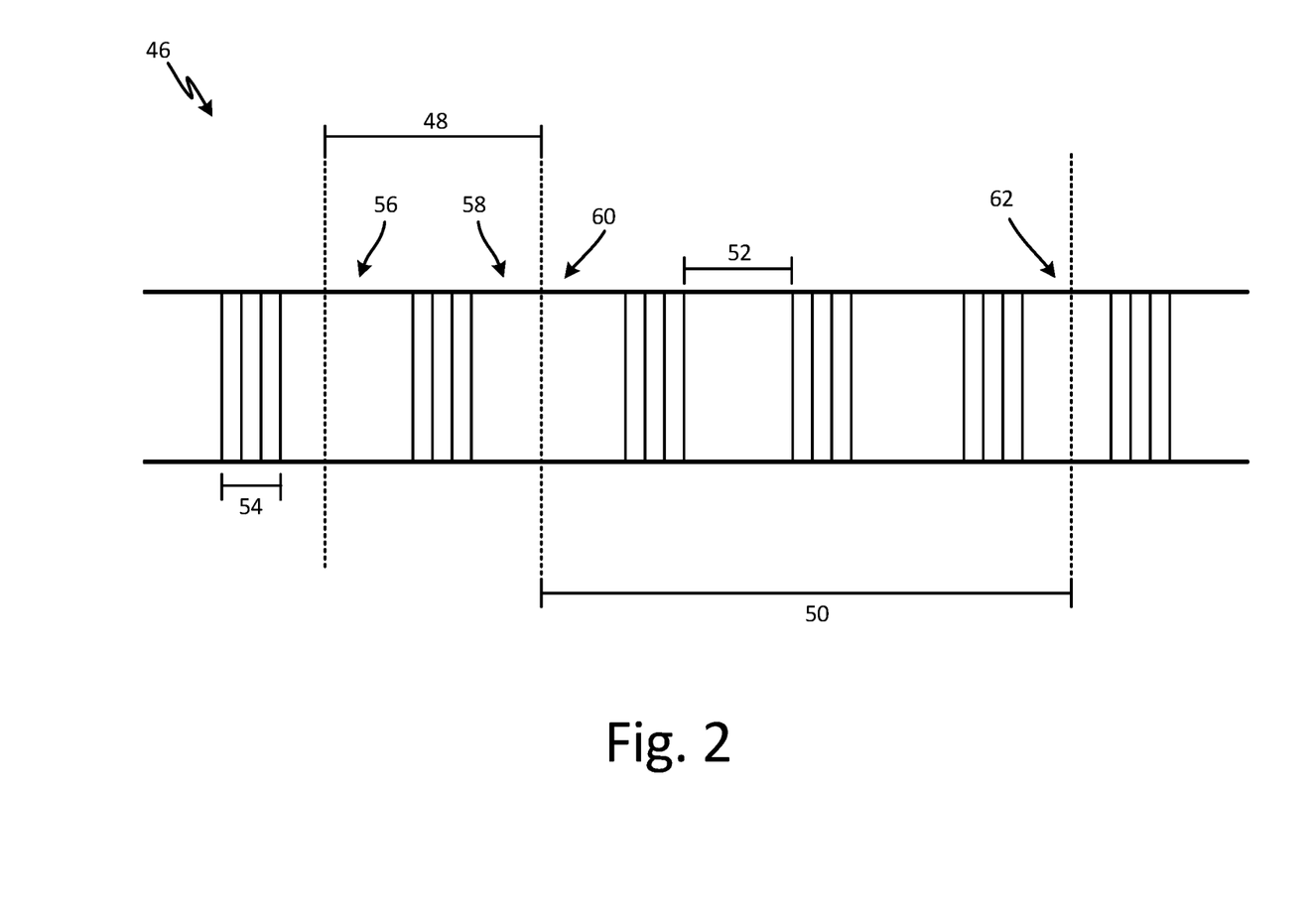
FIG. 2 is an enlarged view of a portion of one embodiment of a temperature sensing fiber optic cable.

FIG. 2 is an enlarged view of a portion of one embodiment of a temperature sensing fiber optic cable 46. Temperature sensing fiber optic cable 46 can be any fiber optic cable of fiber optic cable bundle 18, including first fiber optic cable 26 from FIG. 1. Temperature sensing fiber optic cable 46 includes a first modular fiber optic cable 48 and a second modular fiber optic cable 50. Each modular fiber optic cable includes non-sensing sections 52 and sensing sections 54. Sensing sections 52 contain a number of sensors, which can be fiber Bragg gratings, for example. Second end 58 of first modular fiber optic cable 48 and first end 60 of second modular fiber optic cable 50 are connected at non-sensing section 52. First end 56 of first modular fiber optic cable 48 and second end 62 of second fiber optic cable 50 are connected to the rest of the temperature sensing fiber optic cable 46 at non-sensing sections 52. Connecting modular fiber optic cables at non-sensing sections allows for removal and replacement of modular fiber optic cables without damaging or altering the effectiveness of sensors in the sensing sections.

Modular fiber optic cables can be designed to be various lengths and to contain various amounts of sensing sections containing various quantities of sensors. As shown in FIG. 2, first modular fiber optic cable 48 contains a single sensing section 54 bookended by non-sensing sections 52 at first end 56 and second end 58. Second modular fiber optic cable 50 contains three sensing sections 54 and five non-sensing sections 52. Second modular fiber optic cable 50 has non-sensing section 52 at first end 60 and second end 62. The sensing sections 54 of second modular fiber optic cable 50 are located between non-sensing sections 52 of first end 60 and second end 62 with two more non-sensing sections 52 separating sensing sections 54. Modular fiber optic cables are not limited to a single sensing section or even three sensing sections. One skilled in the art will appreciate that the number of sensing and non-sensing sections are only limited by the length of the modular cable and the length needed for each sensing and non-sensing section.

Modular fiber optic cables can be standardized to facilitate replacement of damaged or otherwise compromised portions of the temperature sensing fiber optic cable. Thus, when a portion of the temperature sensing fiber optic cable needs to be replaced, a modular fiber optic cable may be inserted in place of the removed portion that matches the length, number of sensing sections, the spacing of the sensing sections, and the sensing characteristics of the removed portion. When no single modular fiber optic cable matches the compromised portion of the temperature sensing fiber optic cable a modular fiber optic cable can be modified to match the compromised portion. Modifications may include removing portions of the modular fiber optic cable and/or splicing the modular fiber optic cable with one or more additional modular fiber optic cables.

Figure 3:
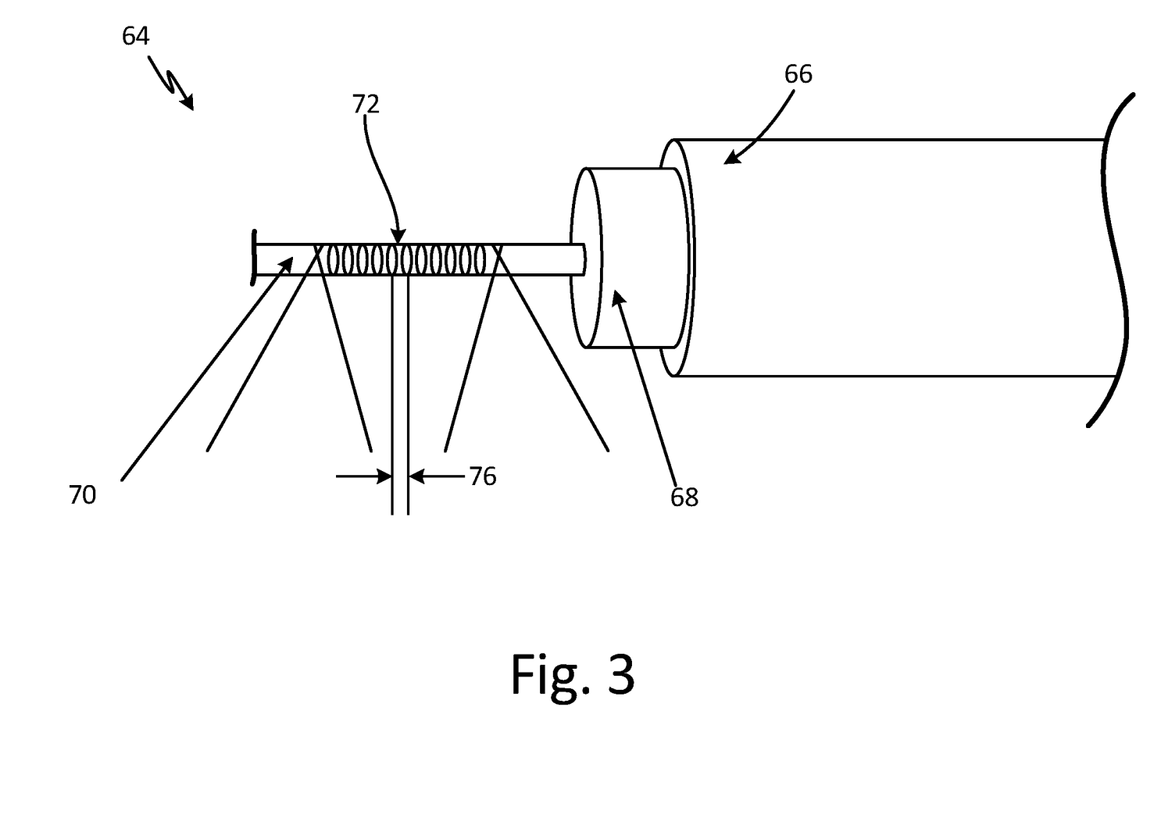
FIG. 3 is an enlarged view of a portion of a modular fiber optic cable containing fiber Bragg gratings.

FIG. 3 is an enlarged view of a portion of one embodiment of a modular fiber optic cable 64 containing fiber Bragg gratings 72 in a sensing section 74. As shown, the modular fiber optic cable 64 includes a protective coating layer, or jacket 66, a cladding layer 68, and a fiber core 70. One skilled in the art will appreciate that some fiber optic cables may include more layers and in some cases multiple cores, each with their own cladding layer. The fiber core 70 provides an optical signal path. The fiber core 70 may be made of materials such as plastic or glass. The cladding 68 surrounds the fiber core 70 and may be made of materials such as glass or plastic. The cladding 68 is designed to have a lower index of refraction than the fiber core 70. The lower index of refraction causes light traveling through the fiber core 70 to be reflected off the inner surface of the cladding 68 and guide the light down the fiber core 70. The protective coating 66 surrounds the cladding 68 and may be made of materials such as polymers, polyvinyl chloride, polyethylene, polyurethane, polybutylene terephthalate, or polyamide. The modular fiber optic cable 64 may include other layers such as buffer layers, strength layers, etc.

The fiber core 70 of the modular fiber optic cable 64 includes fiber Bragg gratings 72 as shown. The fiber Bragg gratings 72 can be written, etched, or otherwise formed into the fiber core 70. The center frequency of the sensing section 74 is determined by the spacing or period 76 of the fiber Bragg gratings 72 within the sensing section 72. Fiber Bragg gratings are a reflector structure that will reflect a wavelength of light corresponding to the period 76 of the fiber Bragg gratings. The wavelength of light reflected by fiber Bragg gratings is referred to as the center frequency. The center frequency of fiber Bragg gratings is affected by temperature and/or strain. By controlling the strain of a fiber optic cable containing fiber Bragg gratings, the fiber optic cable can be used to sense temperature by monitoring the center frequency. Non-sensing sections of fiber core 70 do not include fiber Bragg gratings.

The jacket 66 can be color coded or otherwise marked or identified to indicate sensing and non-sensing sections, in some embodiments. The jacket 66 may have one color for sensing sections and a second color for non-sensing sections. The jacket 66 may also have multiple colors for the sensing sections to further indicate the center frequency of the sensing sections. The jacket 66 may have markings to indicate the sensing sections, the non-sensing sections, and the center frequency of the sensing sections. These markings can include serial numbers, symbols, lines, or other markings.

Figure 4A:
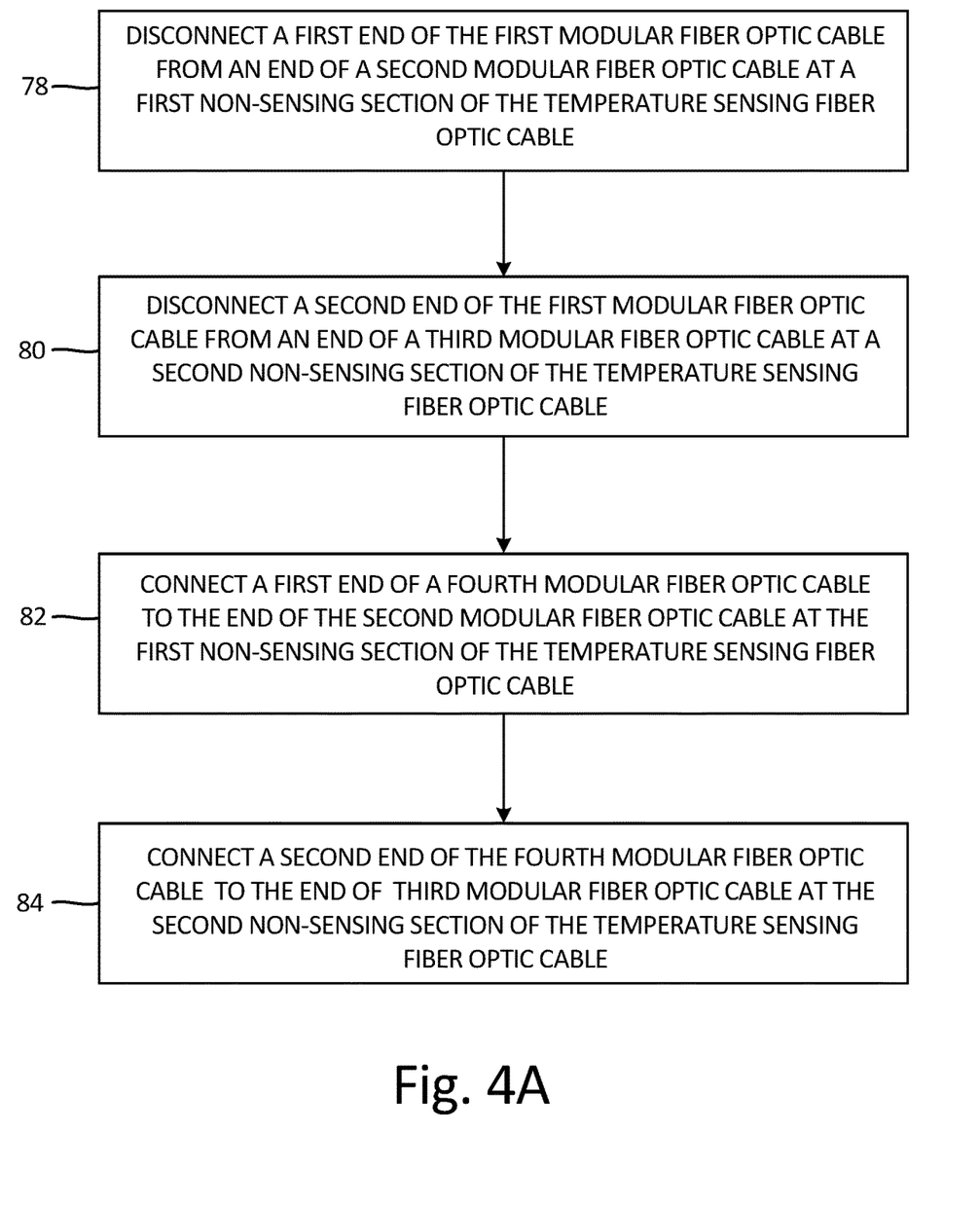
FIG. 4A is a flow diagram depicting a process for replacing a portion of a temperature sensing fiber optic cable.
Figure 4B:
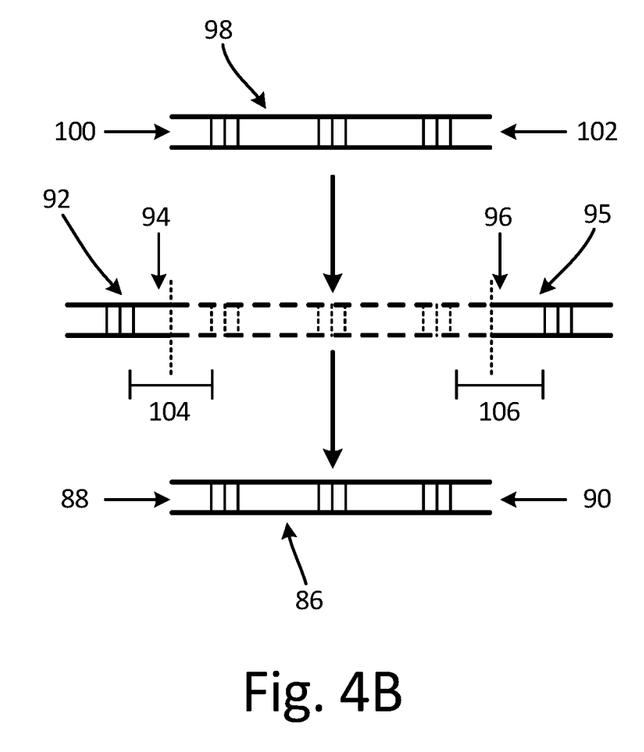
FIG. 4B is a diagram depicting the process of FIG. 4A.

FIG. 4A is a flow diagram depicting a process for replacing a portion of a temperature sensing fiber optic cable. FIG. 4B is a diagram depicting the process of FIG. 4A. In step 78, first end 88 of first modular fiber optic cable 86 is disconnected from end 94 of second modular fiber optic cable 92 at first non-sensing section 104 of the temperature sensing fiber optic cable. Disconnecting first modular fiber optic cable 86 and second modular fiber optic cable 92 can include disconnecting first modular fiber optic cable 86 from an optical coupler or cutting the temperature sensing fiber optic cable at first non-sensing section 104. First non-sensing section 104 may be where first modular fiber optic cable 86 and second modular fiber optic cable 92 are fused together, or first non-sensing section 104 may be a continuous portion of the temperature sensing fiber optic cable. In step 80, second end 90 of first modular fiber optic cable 86 is disconnected from end 96 of third modular fiber optic cable 95 at second non-sensing section 106 of the temperature sensing fiber optic cable. Disconnecting first modular fiber optic cable 86 and third modular fiber optic cable 95 can include disconnecting the first fiber optic cable 86 from an optical coupler or cutting the temperature sensing fiber optic cable at second non-sensing section 106. Second non-sensing section 106 may be where the first modular fiber optic cable 86 and third modular fiber optic cable 95 are fused together, or second non-sensing section 106 may be a continuous portion of the temperature sensing fiber optic cable. At step 82, first end 100 of fourth modular fiber optic cable 98 is attached to end 94 of second modular fiber optic cable 92 at first non-sensing section 104 of the temperature sensing fiber optic cable. Connecting fourth modular fiber optic cable 98 and second modular fiber optic cable 92 can include connecting fourth modular fiber optic cable 98 to an optical coupler, or splicing the fourth modular fiber optic cable 98 and second modular fiber optic cable 92 together using fusion splicing. At step 84, second end 102 of fourth modular fiber optic cable 98 is attached to end 96 of third modular fiber optic cable 95 at second non-sensing section 106 of the temperature sensing fiber optic cable. Connecting fourth fiber optic cable 98 and third modular fiber optic cable 95 can include connecting fourth modular fiber optic cable 98 to an optical coupler, or splicing fourth modular fiber optic cable 98 and third modular fiber optic cable 95 together using fusion splicing. As illustrated in FIG. 4B, first modular fiber optic cable 86 and fourth modular fiber optic cable 98 have identical configurations, so that the performance of the temperature sensing fiber optic cable is unchanged. Replacing the portion of fiber optic cable can include replacing protective covering or jacket of the fiber optic cable.

Discussion of Possible Embodiments

The following are non-exclusive descriptions of possible embodiments of the present invention.

A temperature sensing fiber optic cable can include a plurality of modular fiber optic cables connected together to form the temperature sensing fiber optic cable, each modular fiber optic cable including at least one sensing section and at least one non-sensing section, the at least one sensing section including a plurality of sensors; and wherein each modular fiber optic cable is connected to at least one other modular fiber optic cable at non-sensing sections thereof.

The temperature sensing fiber optic cable of the preceding paragraph can optionally include, additionally and/or alternatively, any one or more of the following features, configurations and/or additional components:

The plurality of modular fiber optic cables can be connected together using fusion splicing.

A modular fiber optic cable of the plurality of modular fiber optic cables can include a first non-sensing section at a first end of the fiber optic cable; a second non-sensing section at a second end of the fiber optic cable; and a first sensing section located between the first non-sensing section and the second non-sensing section.

The plurality of modular fiber optic cables can further comprise a color coded jacket; wherein the color coded jacket can have a first color corresponding to and covering the at least one non-sensing section; and wherein the color coded jacket can have a second color corresponding to and covering the at least one sensing section.

The plurality of sensing sections can be configured to the same center frequency.

The plurality of sensors can be fiber Bragg gratings.

The plurality of modular fiber optic cables can further comprise a jacket, the jacket can include a serial number corresponding to the center frequency of the at least one sensing section.

A system can be configured to monitor temperature in an aircraft, the system can comprise: a plurality of modular fiber optic cables connected together to form the temperature sensing fiber optic cable, each of the modular fiber optic cables includes at least one sensing section and at least one non-sensing section, the at least one sensing section including fiber Bragg gratings; and wherein each of the modular fiber optic cables is connected to at least one other modular fiber optic cable at non-sensing sections thereof.

The system of the preceding paragraph can optionally include, additionally and/or alternatively, any one or more of the following features, configurations and/or additional components:

The plurality of modular fiber optic cables of at least one of the plurality of temperature sensing fiber optic cables can be connected together using fusion splicing.

A first modular fiber optic cable of the plurality of modular fiber optic cables of at least one of the plurality of temperature sensing fiber optic cables can include a first non-sensing section at a first end of the fiber optic cable; a second non-sensing section at a second end of the fiber optic cable; and a first sensing section located between the first non-sensing section and the second non-sensing section.

A second modular fiber optic cable of the plurality of modular fiber optic cables of at least one of the temperature sensing fiber optic cables can include a plurality of non-sensing sections; and a plurality of sensing sections containing fiber Bragg gratings.

The plurality of sensing sections can be configured to the same center frequency.

The at least one temperature sensing fiber optic cable can further include a jacket with indicia indicating the sensing and non-sensing sections.

The jacket can further include indicia indicating the center frequency of the sensing sections.

The at least one temperature sensing fiber optic cable can comprise: a first temperature sensing fiber optic cable spanning a first plurality of zones of the aircraft; and a second temperature sensing fiber optic cable spanning a second plurality of zones of the aircraft.

The plurality of sensors of the first temperature sensing fiber optic cable can reflect a different center frequency for each zone; and wherein the plurality of sensors of the second temperature sensing fiber optic cable can reflect the same center frequency for each zone.

The first and second temperature sensing fiber optic cables can span at least one of the same zones.

A method for replacing a modular fiber optic cable of a temperature sensing fiber optic cable, the method can comprise disconnecting a first end of a first modular fiber optic cable from an end of a second modular fiber optic cable at a first non-sensing section of the temperature sensing fiber optic cable; disconnecting a second end of the first modular fiber optic cable from an end of a third modular fiber optic cable at a second non-sensing section of the temperature sensing fiber optic cable; connecting a first end of a fourth modular fiber optic cable to the end of the second modular fiber optic cable at the first non-sensing section of the temperature sensing fiber optic cable; and connecting a second end of the fourth modular fiber optic cable to the end of the third modular fiber optic cable at the second non-sensing section of the temperature sensing fiber optic cable.

The method of the preceding paragraph can optionally include, additionally and/or alternatively, any one or more of the following features, configurations and/or additional components:

Disconnecting the first end of the modular fiber optic cable can include cutting the temperature sensing fiber optic cable at the first non-sensing section; and wherein disconnecting the second end of the modular fiber optic cable can includes cutting the temperature sensing fiber optic cable at the second non-sensing section.

Connecting a first end of the fourth modular fiber optic cable can include fusion splicing a first end of the fourth modular fiber optic cable to the end of the second modular fiber optic cable; and wherein connecting a second end of the fourth modular fiber optic cable can include fusion splicing a second end of the fourth modular fiber optic cable to the end of the third modular fiber optic cable.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. At least one temperature sensing fiber optic cable comprising:
   a plurality of modular fiber optic cables connected together to form the temperature sensing fiber optic cable, each modular fiber optic cable including at least one sensing section and at least one non-sensing section, the at least one sensing section including a plurality of sensors;
   a first temperature sensing fiber optic cable spanning a first plurality of zones with the first temperature sensing fiber optic cable reflecting a different center frequency for each zone;
   a second temperature sensing fiber optic cable spanning a second plurality of zones with the second fiber optic cable reflecting the same center frequency for each zone; and
   wherein each modular fiber optic cable is connected to at least one other modular fiber optic cable at non-sensing sections thereof.

2. The temperature sensing fiber optic cable of claim 1, wherein the plurality of modular fiber optic cables are connected together using fusion splicing.

3. The temperature sensing fiber optic cable of claim 1, wherein a first modular fiber optic cable of the plurality of modular fiber optic cables includes:
   a first non-sensing section at a first end of the first modular fiber optic cable;
   a second non-sensing section at a second end of the first modular fiber optic cable; and
   a first sensing section located between the first non-sensing section and the second non-sensing section.

4. The temperature sensing fiber optic cable of claim 1, wherein the plurality of modular fiber optic cables further comprise a color coded jacket;
   wherein the color coded jacket has a first color corresponding to and covering the at least one non-sensing section;
   wherein the color coded jacket has a second color corresponding to and covering the at least one sensing section.

5. The temperature sensing fiber optic cable of claim 4, wherein each of the at least one sensing section is configured to the same center frequency.

6. The temperature sensing fiber optic cable of claim 1, wherein the plurality of sensors are fiber Bragg gratings.

7. The temperature sensing fiber optic cable of claim 1, wherein each of the plurality of modular fiber optic cables further comprises a jacket, the jacket including a serial number corresponding to a center frequency of the at least one sensing section.

8. A system configured to monitor temperature in an aircraft, the system comprising:
   at least one temperature sensing fiber optic cable comprising:
      a plurality of modular fiber optic cables connected together to form the temperature sensing fiber optic cable, each of the modular fiber optic cables includes at least one sensing section and at least one non-sensing section, the at least one sensing section including fiber Bragg gratings;
      a first temperature sensing fiber optic cable spanning a first plurality of zones of the aircraft with the first temperature sensing fiber optic cable reflecting a different center frequency for each zone;
      a second temperature sensing fiber optic cable spanning a second plurality of zones of the aircraft with the second fiber optic cable reflecting the same center frequency for each zone; and
      wherein each of the modular fiber optic cables is connected to at least one other modular fiber optic cable at non-sensing sections thereof.

9. The system of claim 8, wherein the plurality of modular fiber optic cables are connected together using fusion splicing.

10. The system of claim 8, wherein a first modular fiber optic cable of the plurality of modular fiber optic cables includes:
    a first non-sensing section at a first end of the first modular fiber optic cable;
    a second non-sensing section at a second end of the first modular fiber optic cable; and
    a first sensing section located between the first non-sensing section and the second non-sensing section.

11. The system of claim 10, wherein a second modular fiber optic cable of the plurality of modular fiber optic cables includes:
    a plurality of non-sensing sections; and
    a plurality of sensing sections containing fiber Bragg gratings.

12. The system of claim 11, wherein the plurality of sensing sections are configured to the same center frequency.

13. The system of claim 8, wherein the at least one temperature sensing fiber optic cable further includes a jacket with indicia indicating the sensing and non-sensing sections.

14. The system of claim 13, wherein the jacket further includes indicia indicating the center frequency of the sensing sections.

15. The system of claim 8, wherein the first and second temperature sensing fiber optic cables span at least one of the same zones.

16. A method for replacing a first modular fiber optic cable of a temperature sensing fiber optic cable, the method comprising:
    disconnecting a first end of the first modular fiber optic cable from an end of a second modular fiber optic cable at a first non-sensing section of the temperature sensing fiber optic cable;
    disconnecting a second end of the first modular fiber optic cable from an end of a third modular fiber optic cable at a second non-sensing section of the temperature sensing fiber optic cable;
    connecting a first end of a fourth modular fiber optic cable to the end of the second modular fiber optic cable at the first non-sensing section of the temperature sensing fiber optic cable; and
    connecting a second end of the fourth modular fiber optic cable to the end of the third modular fiber optic cable at the second non-sensing section of the temperature sensing fiber optic cable,
    wherein the temperature sensing fiber optic cable includes a first temperature sensing subcable spanning a first plurality of zones with the first temperature sensing subcable reflecting a different center frequency for each zone and a second temperature sensing subcable spanning a second plurality of zones with the second temperature sensing subcable reflecting the same center frequency for each zone.

17. The method of claim 16, wherein disconnecting the first end of the modular fiber optic cable includes cutting the temperature sensing fiber optic cable at the first non-sensing section; and wherein disconnecting the second end of the modular fiber optic cable includes cutting the temperature sensing fiber optic cable at the second non-sensing section.

18. The method of claim 16, wherein connecting a first end of the fourth modular fiber optic cable includes fusion splicing a first end of the fourth modular fiber optic cable to the end of the second modular fiber optic cable; and wherein connecting a second end of the fourth modular fiber optic cable includes fusion splicing a second end of the fourth modular fiber optic cable to the end of the third modular fiber optic cable.

* * * * *